June 21, 1955    U. B. RYLANDER    2,711,106
METHOD IN MANUFACTURING DIES INTENDED FOR CUTTING
BLANKS FROM LEATHER, FABRIC, RUBBER, ETC
Filed June 3, 1954
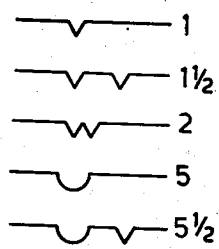
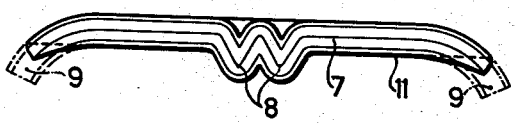
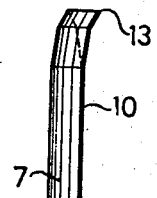
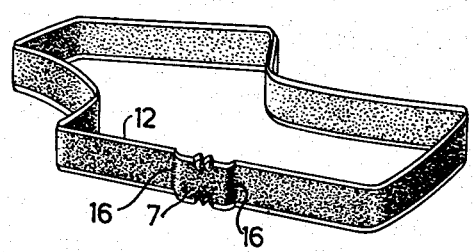
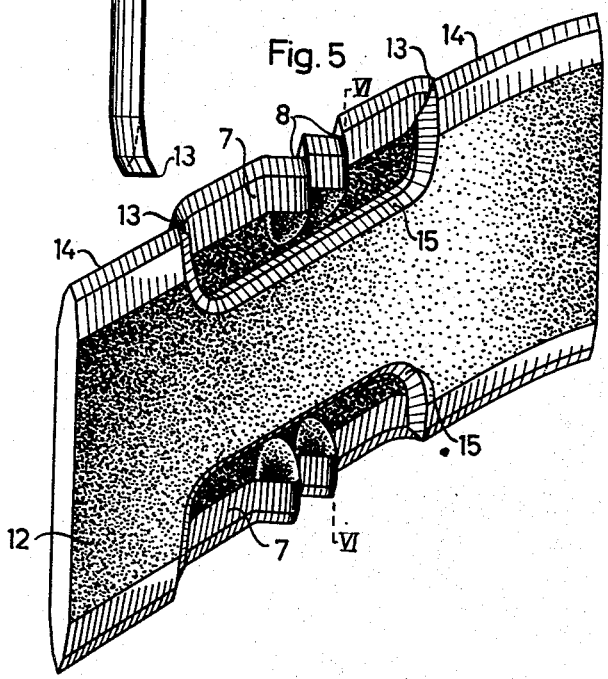
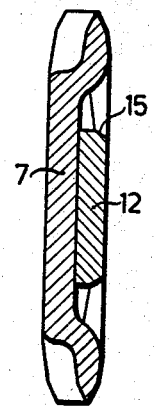

United States Patent Office 2,711,106
Patented June 21, 1955

2,711,106

METHOD IN MANUFACTURING DIES INTENDED FOR CUTTING BLANKS FROM LEATHER, FABRIC, RUBBER, ETC.

Uno Bernhard Rylander, Stockholm, Sweden, assignor to Svenska Skofabrikantforeningen, Stockholm, Sweden, a corporation of Sweden Application June 3, 1954, Serial No. 434,194

1 Claim. (Cl. 76—107)

For cutting leather, rubber, fabric, etc., for instance in shoe manufacture, it is customary to use dies consisting of one or more steel strips bent into a desired shape and having one or both longitudinal edges ground to cutting edges. To enable the cut blanks to be easily identified with regard to their size numbers it is usual to provide the edges of dies having equal shapes but different sizes with different markings which then appear in the contour of the cut blanks and thus indicate their size. Examples of markings used for different shoe sizes are shown in Fig. 1 of the drawing.

The invention relates to a method of providing markings in the cutting edges of dies for the purpose indicated above, which method comprises cutting off a piece of a steel strip having at least one longitudinal cutting edge, providing markings in the edge line of said piece by subjecting it to a press operation involving a shearing of the material next to the edge while maintaining the height of the edge unchanged, bending the ends of said piece transverse to the cutting edge in the same direction, smoothing down said ends to conform to the contour of one side of the die, removing the edge of the die along a section substantially corresponding to the length of the marking piece and fastening the latter to one side of the die along said removed section to have its edge ends in contact with the adjacent edges of the die.

The method according to the invention will be more closely described with reference to the accompanying drawings, in which:

Figure 2 shows a piece of strip steel provided with markings in the cutting edge.

Figure 3 shows the strip of Fig. 2 as seen from one end.

Figure 4 shows the piece of strip welded to the outside of a die.

Figure 5 shows the same mounting as in Fig. 4, seen from the inside of the die and on a larger scale.

Figure 6, finally, shows a section along the line VI—VI in Figure 5.

As the die does not per se constitute any part of the invention, the manner of its manufacturing will not be discussed below. It may be sufficient to mention that both longitudinal edges of the steel strip used for the die are preferably sharpened to cutting edges, and that said cutting edges are generally made by facet grinding, as shown to the left in Fig. 5. However, the invention is not bound to such an embodiment.

The marking piece shown in Fig. 2 is produced by sharpening the longitudinal edges of a straight steel strip while in soft state, whereafter the strip is cut into smaller pieces 7. The ground edges of such a piece 7 are given the desired marking 8 by deformation of the edge portions in a pressing tool (not shown) provided for this purpose. To keep the height of the edges unchanged it is of importance that the deformation occurs by shearing and not by bending. The deformation thus obtained is clearly to be seen from Figs. 5 and 6, where it is also shown how the deformations extend only a short distance behind the facetted edge portions.

The ends of the strip piece 7 are bent in the same direction, as shown at 9 by dotted lines in Fig. 2, and this bending may be carried out simultaneously with, before or after said pressing operation. Said ends are then smoothed to obtain the concave contour shown to the right in Fig. 3, i. e. a contour corresponding to the convex cross section of the die. As it is to prefer to mount the marking piece along a straight section of the die, the end surfaces of the piece (10 in Fig. 3) should be parallel to or lie in the same plane as adjacent inside (11 in Fig. 2) of the marking piece.

The marking piece so produced is tempered in some suitable way and is then ready to be fastened to one side of a die 12 in such a manner that its edges are on the same level as those of the die. Due to the contour grinding the end surfaces of the marking piece are closely adapted to the side of the die, the ends 13 of the edges of the marking piece being in contact with the edges 14 of the die, as apparent from Fig. 5. As mentioned above, the edges of the die are to be removed along the section between the spots where the edge ends 13 contact the edges 14, and this is done by grinding (at 15), preferably before the marking piece is put in. It is without importance, if the edges 14 should continue a little inside the contact spots, and therefore no great accuracy is needed. The marking piece is preferably fixed by spot welding, taking care that the welds 16 are not placed too close to the edges, so that their hardness is impaired.

The method described involves a simple and effective mounting of marking pieces without much work. The marking pieces may be produced in large quantities at a low price to be mounted on the dies when needed. If, for some reason, it is desirable to place them on a curved surface of the die, they may be bent somewhat, so that their end surfaces become parallel to the corresponding die surfaces.

What I claim is:

A method of providing markings in the cutting edges of a die intended for cutting leather, fabric, rubber etc. and consisting of at least one bent steel strip having at least one longitudinal cutting edge, comprising cutting off a piece of a steel strip having at least one longitudinal cutting edge, providing markings in the edge line of said piece by subjecting it to a press operation involving a shearing of the material next to the edge while maintaining the height of the edge unchanged, bending the ends of said piece transverse to the cutting edge in the same direction, smoothing down said ends to conform to the contour of one side of the die, removing the edge of the die along a section substantially corresponding to the length of the marking piece and fastening the latter to one side of the die along said removed section to have its edge ends in contact with the adjacent edges of the die.

No references cited.